(12) United States Patent
Billing et al.

(10) Patent No.: US 7,560,080 B2
(45) Date of Patent: Jul. 14, 2009

(54) METHOD AND DEVICE FOR GENERATING OZONE

(75) Inventors: Ernst Martin Billing, Enger (DE); Ralf Fiekens, Stukenbrock (DE); Uwe Hofer, Herford (DE)

(73) Assignee: WEDECO Gesellschaft für Umwelttechnologie mbH, Düsseldof (DE)

( * ) Notice: Subject to any disclaimer, the term of this patent is extended or adjusted under 35 U.S.C. 154(b) by 700 days.

(21) Appl. No.: 10/478,022

(22) PCT Filed: May 24, 2002

(86) PCT No.: PCT/DE02/01890

§ 371 (c)(1),
(2), (4) Date: Nov. 14, 2003

(87) PCT Pub. No.: WO02/096798

PCT Pub. Date: Dec. 5, 2002

(65) Prior Publication Data

US 2004/0140195 A1    Jul. 22, 2004

(30) Foreign Application Priority Data

May 26, 2001  (DE) ................................ 101 25 823

(51) Int. Cl.
*B01J 19/08* (2006.01)

(52) U.S. Cl. ........................... 422/186.07; 422/186.18; 204/176

(58) Field of Classification Search ............ 422/186.07, 422/186.18; 204/176
See application file for complete search history.

(56) References Cited

U.S. PATENT DOCUMENTS

| 4,232,229 | A |   | 11/1980 | Tanaka et al. |
| 5,169,606 | A | * | 12/1992 | Batchelor ............... 422/186.19 |
| 5,554,345 | A |   | 9/1996 | Kitchenman |
| 6,106,788 | A |   | 8/2000 | Rau et al. |

FOREIGN PATENT DOCUMENTS

| GB | 2320171 | 10/1998 |
| JP | 52015492 | 2/1997 |
| JP | 10203805 | 8/1998 |
| WO | WO 97/09268 | 3/1997 |

* cited by examiner

*Primary Examiner*—Kishor Mayekar
(74) *Attorney, Agent, or Firm*—Collard & Roe

(57) ABSTRACT

A method for generating ozone from gases containing oxygen. The ozone is generated by silent electric discharge in an installation comprising at least two gaps, which are traversed by the gas, each of said gaps being formed between an electrode and a dielectric that separates each gap from an additional electrode. According to the invention, the restriction of the volumetric flow of the gas of at least one gap is controlled.

11 Claims, 2 Drawing Sheets

METHOD AND DEVICE FOR GENERATING OZONE

CROSS REFERENCE TO RELATED APPLICATIONS

Applicants claim priority under 35 U.S.C. §119 of GERMAN Application No. 101 25 823.2 filed on May 26, 2001. Applicants also claim priority under 35 U.S.C. §365 of PCT/DE02/01890 filed on May 24, 2002. The international application under PCT article 21(2) was not published in English.

BACKGROUND OF THE INVENTION

1. Field of the Invention

The invention relates to a method for generating ozone and a device for generating ozone.

2. The Prior Art

Ozone is a strong oxidizing agent for organic substances and for inorganic compounds in which elements having several oxidation stages are present. Of the numerous applications for this oxidizing agent, over the last few years applications for water treatment in particular have been intensively further developed.

Ozone is generated by electric discharge in an oxygen-containing gas. The so-called silent discharge represents a stable plasma or corona discharge in contrast to the spark discharge. In this case molecular oxygen is dissociated into atomic oxygen. The reactive oxygen atoms thus formed are added to the existing oxygen molecules in an exothermic reaction and thus form the tri-atomic ozone molecule.

Important parameters for the efficiency of the overall reaction chain are the gas composition, the electric field strength, the operating temperature and the operating pressure of the ozone-generating system.

Over the last few years, as a result of technological progress with manufacturing tolerances increasingly smaller reaction gaps have been achieved, which influence both the field strength and the temperature established in the gap. Gap widths of 250 µm are now state of the art.

A device of the type specified initially is known from WO 97/09268. The device comprises an arrangement with at least one gap through which the gas flows, which is formed between an electrode and a dielectric that separates the gap from another electrode. At least one of the gaps is filled with an electrically conductive and thermally conductive gas-permeable arrangement which is in electrical and thermal contact with the adjacent electrode and through which the oxygen-containing gas flows and which forms a plurality of discharge spaces in which the oxygen-containing gas is exposed to a high field strength and is converted into ozone.

The electrically and thermally conductive gas-permeable arrangement described there at least completely fills one gap and preferably comprises wire which is constructed as knit.

By adapting the mesh number, mesh size, and wire thickness as well as the knit density, the number of knit wires and the number of knit layers, it is possible to establish the flow resistance of the arrangement, to adapt the size of the discharge spaces for maximal ozone production, to regulate the turbulence and intermixture of the gas, and to optimise cooling and heat dissipation.

SUMMARY OF THE INVENTION

Starting from this prior art, the object of the invention is generally to provide a method and a suitable device with which the ozone yield can be significantly increased for comparable energy input.

This object is achieved by a method according to the invention and a device according to the invention.

In the method according to the invention a distribution of the total volumetric flow of gas between the gaps is controlled by a concentrated restriction of the volumetric flow at least of one gap.

As a result of the specific adjustment of the gas distribution between the gaps according to the invention, an increase in the efficiency of ozone generation is achieved taking into account gap optimizations with regard to the physical effects used, the field strength profile and the temperature profiles. It was found that by specifically influencing the volumetric flow of gas with a given gap geometry and given electrical/physical operating conditions, it is possible to optimize the ozone yield compared to the electrical energy used.

If two gaps are used through which gas flows in parallel, optimization can conventionally only be achieved for one of the gaps or for an average of the two gaps. As a result of the measure according to the invention, it was possible to perform an optimization for each of the gaps, whereby the total ozone yield is increased further compared to the electrical energy used.

The method according to the invention can be used for systems in which two or a plurality of gaps are used for the discharge. In such a multi-gap system certain advantages of individual gaps can be brought out by the defined distribution of the total volumetric flow of the gas. Thus, for example, it is possible to set the field strength profile as the base parameter in order to force a distribution of the total volumetric flow of gas onto a gap such that the energetically most favourable gap can generate most of the ozone.

Practice has shown that in conventional devices having at least two gaps arranged in parallel the distribution of the total volumetric flow of gas between the gaps is substantially imprinted by the geometry of the gaps itself. No method which can control the distribution of the total volumetric flow of gas is known. Using a knit completely filling the gap, as described in WO 97/09268, a defined distribution of the total volumetric flow can be achieved with only a slight variation of around 2 to 8%.

Optimizing only one gap with regard to an increase in the efficiency of ozone generation, for example, by reducing the gap width, in the same way has an effect on the corresponding gap and results in no significant change in the ozone yield overall.

In order to implement the method according to the invention a concentrated restriction of the volumetric flow of the gas of at least one gap is made. Concentrated restriction is understood to mean that the throttle section has a length substantially smaller than the length of the gap. The restriction can take place at the inlet or outlet or inside the gap or a subcombination at the inlet and outlet or at the inlet and inside the gap or at the outlet and inside the gap or at the inlet and outlet and inside the gap.

In addition, a distribution of the total volumetric flow of the gas between the gaps can be additionally controlled by an elongated restriction of the volumetric flow of gas at least within one gap. Elongated restriction is understood to mean a length of throttle section which extends over the total length or at least 20% of the length of the gap.

The device according to the invention is characterised in that at least one gap comprises a concentrated throttle which leads to a defined distribution of the total volumetric flow of gas between the gaps.

The volumetric flow is in this case inversely proportional to the flow resistance brought about by the concentrated throttle in the gap. The total volumetric flow is made up of the individual volumetric flows of the gaps. Depending on the configuration of the restriction, a defined distribution of the total volumetric flow of gas between the gaps can thus be established.

In addition, at least one gap can additionally comprise an elongated throttle. In this case, the elongated throttle can be formed by a profiling of the surface of the electrode and/or dielectric pointing towards the gap. It is thereby possible to divide up the throttle effect and achieve a fine adjustment with the concentrated throttle.

The concentrated throttle can comprise a sleeve extending substantially over the cross-section of the gap through which gas can flow and/or a stopper extending substantially over the cross-section of the gap through which gas can flow.

With this configuration a pressure drop leads to a defined distribution of the total volumetric flow of the gas between the gaps.

The throttle formed as a sleeve or stopper preferably consists of a full-material body. This extends completely over the cross-section of the gap and is provided with gas-permeable slits or holes and/or extends over a partial cross-section of the gap. The throttle effect of the full-material body thus formed is based on a nozzle effect.

In an advantageous development of the invention, the concentrated throttle is annular-shaped and arranged in a first and/or second gap. In this case, the first gap is formed by a cylindrical annulus formed between a first electrode and a dielectric and the second gap is formed by a cylindrical annulus enclosed between the dielectric and a second electrode.

In such an arrangement the volumetric flow of gas is only distributed over two gaps. In this case, the distribution of the volumetric flow of gas can be controlled especially easily to increase the ozone yield.

A further development provides that the throttle comprises an integrated high-voltage fuse. In order to avoid damage to the device, especially the electrode surface, the dielectric or the high-voltage generator, a separate fuse can thereby be dispensed with.

The body suitably consists of oxygen- and ozone-resistant material. This measure provides constant ozone-generating properties and freedom from maintenance.

As an alternative to the cylindrically symmetrical arrangement of the invention it is provided that the throttle and the first and second electrode and the dielectric are constructed as plate-shaped.

According to an advantageous development of the invention the distribution of the volumetric flow of gas between the gaps can be adjusted in a range of 20 to 80% which leads to a substantial increase in efficiency compared with the prior art.

A particular advantage of the invention is that by individually dimensioning the flow resistance of the throttles, structural component tolerances influencing the ozone gas yield in one series of the device can be compensated.

This helps to reduce the waste fractions during production and allows the manufacture of apparatus having narrow tolerances of the characteristic values and thus precisely calculable characteristic values of complete installations.

BRIEF DESCRIPTION OF THE DRAWINGS

The invention is explained below with reference to exemplary embodiments shown in the drawings. In the figures.

DETAILED DESCRIPTION OF PREFERRED EMBODIMENTS

Figure 1:
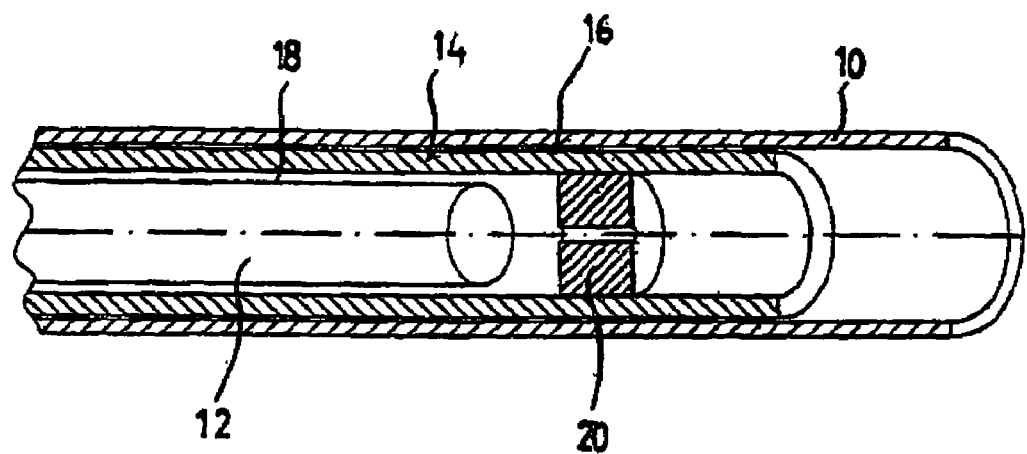
FIG. 1 shows a part-perspective sectional view of a device in a cylindrically symmetrical arrangement with a throttle constructed as a stopper and FIG. 2 shows a part-perspective sectional view of a device in a cylindrically symmetrical arrangement with a throttle constructed as a sleeve.
Figure 2:
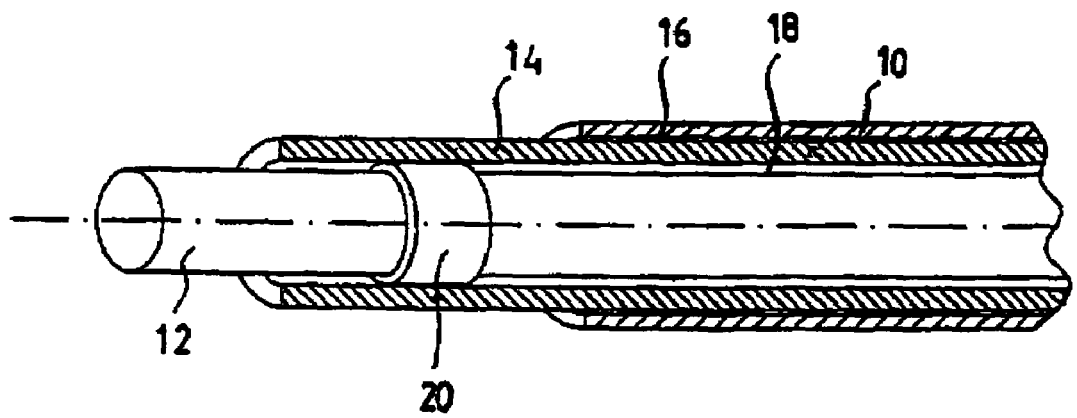

FIGS. 1 and 2 show a special cylindrically symmetrical arrangement of the device. A first outer electrode 10 which is at reference potential, has a cylindrical dielectric 14 inside and this in turn has a second inner electrode 12 which is at high-voltage potential. Gaps 16, 18 are formed both between the first electrode 10 and the dielectric 14 and between the dielectric 14 and the second electrode 12.

A throttle 20 is arranged in the inner gap 18. In FIG. 1 this throttle 20 is constructed in the form of a stopper through which gas can flow, located before the second electrode 12, in the fashion of a nozzle. The stopper is arranged at the end of the inner gap 18. On the other hand, the throttle 20 according to FIG. 2 is constructed in the form of a sleeve enclosing the second electrode 12 in the head region and through which gas can flow.

Stopper and sleeve only fill part of the inner gap 20 and result in restriction of the gap volume. A defined distribution of the volumetric flow of gas between the gaps 16, 18 is thereby achieved.

The gas flowing through the device is opposed by a flow resistance as a result of the throttle 20 which results in a defined distribution of the total volumetric flow of gas between the gaps depending on the arrangement of the throttle 20. As a result of the distribution of the volumetric flow of gas between the gaps an increase in the efficiency of the ozone yield of up to 15% is achieved compared with the prior art.

Figure 3:
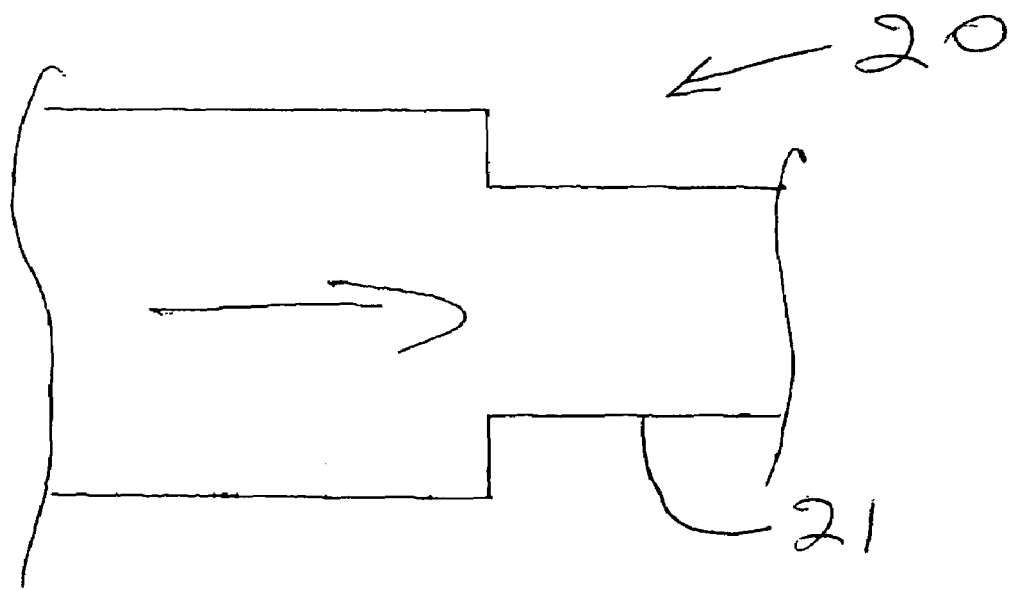
FIG. 3 shows an elongated throttle.

In addition, as shown in FIG. 3. a distribution of the total volumetric flow of the gas between the gaps can be additionally controlled by an elongated restriction 21 of the volumetric flow of gas at least within one gap. Elongated restriction 21 is understood to mean a length of throttle section 20 which extends over the total length or at least 20% of the length of the gap.

Figure 4:
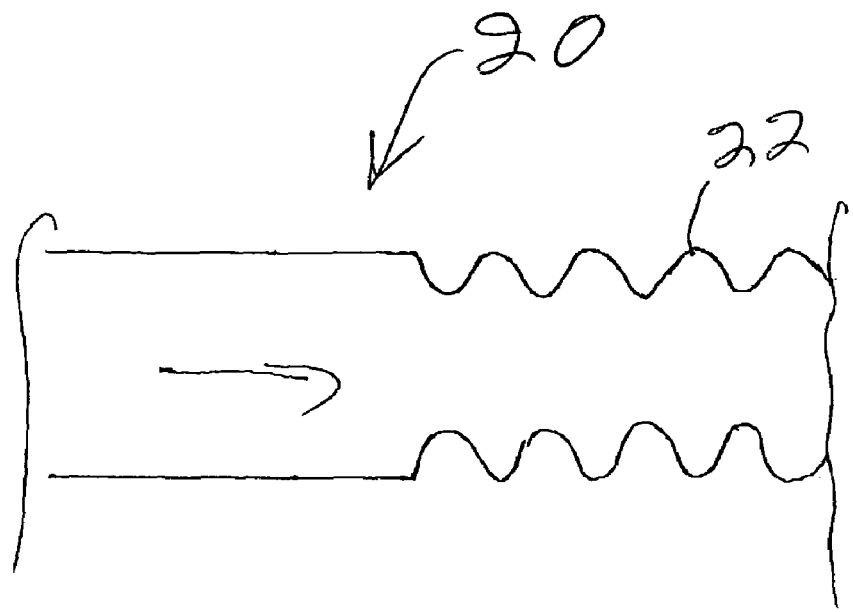
FIG. 4 shows an elongated restriction of the throttle.

In addition, as shown in FIG. 4, at least one gap can additionally comprise an elongated throttle 20. In this case, the elongated throttle 20 can be formed by a profiling 22 of the surface of the electrode and/or dielectric pointing towards the gap. It is thereby possible to divide up the throttle effect and achieve a find adjustment with the concentrated throttle.

The invention claimed is:

1. A method for generating ozone from oxygen-containing gases comprising
   silent electric discharging in an installation having at least two gaps (16, 18), which are traversed by the gas,
   wherein one of said gaps is formed between an electrode (10) and a dielectric (14) and the other gap is formed between said dielectric and an additional electrode (12), said installation having an inlet, an outlet and a throttle;
   distributing a total volumetric flow of the gas between the gaps (16, 18) at said inlet or said outlet or inside the gap (16, 18) or of a subcombination at the inlet and outlet or at the inlet and inside the gap (16, 18) or at the inlet and outlet and inside the gap (16, 18);
   wherein adjusting the distributing of the gas volumetric flow in the gaps (16, 18) is by said throttle (20) in a range of 20 to 80%; and wherein by individually dimensioning a flow resistance of the throttle (20), compensating structural component tolerances having an influence on the ozone yield can be in one series of the installation.

2. The method according to claim 1, wherein the distributing of the total volumetric flow of the gas between the gaps (16, 18) is additionally controlled by an elongated restriction of the volumetric flow of the gas at least inside the gap (16, 18).

3. A device for generating ozone from oxygencontaining gases by silent electric discharge in an installation comprising at least two gaps (16, 18), which are traversed by the gas, wherein one of said gaps is formed between an electrode (10) and a dielectric (14) and the other gap is formed between said dielectric and an additional electrode (12), and said installation having an inlet, an outlet and a throttle; wherein at least one gap (16, 18) of said at least two gaps comprises a concentrated throttle (20) for restriction of a volumetric flow of the gas at said inlet or said outlet or inside the gap (16, 18) or at the outlet and inside the gap (16, 18) or at the inlet and outlet and inside the gap (16, 18);

wherein the distribution of the gas volumetric flow in the gaps (16, 18) is adjustable by the throttle (20) in a range of 20 to 80%; and wherein by individually dimensioning a flow resistance of the throttle (20), structural component tolerances having an influence on the ozone yield can be compensated in one series of the device.

4. The device according to claim 3, wherein at least one gap (16, 18) of said at least two gaps additionally comprises an elongated throttle.

5. The device according to claim 3, wherein the electrode and/or the dielectric is pointing towards the gap.

6. The device according to claim 3, wherein said throttle (20) is constructed as a concentrated throttle sleeve extending substantially over a cross-section of the gap (16, 18) through which gas can flow and/or a stopper extending substantially over the cross-section of the gap (16, 18) through which gas can flow.

7. The device according to claim 6, wherein the throttle (20) constructed as the sleeve or the stopper consists of a fullmaterial body and extends completely over the cross-section of the gap (16, 18) and is provided with gas-permeable slits or holes and/or extends over a partial cross-section of the gap (16, 18).

8. The device according to claim 3, wherein said two gaps comprise a first gap and a second gap, and wherein the concentrated throttle (20) is annular-shaped and is arranged in the first gap and/or the second gap (16, 18) wherein the first gap (16) is formed by a cylindrical annulus enclosed between the dielectric (14) and said additional electrode (12).

9. The device according to claim 3, wherein the throttle (20) comprises an integrated high-voltage fuse.

10. The device according to claim 3, wherein the throttle (20) consists of an oxygen— and ozone-resistant material.

11. The device according to claim 3, wherein the throttle (20) and said electrode and said additional electrode (10, 12) and the dielectric (14) are plate-shaped.

* * * * *